United States Patent [19]

Etzbach et al.

[11] Patent Number: 5,436,306
[45] Date of Patent: Jul. 25, 1995

[54] METHINE OR AZAMETHINE DYE POLYMERS

[75] Inventors: Karl-Heinz Etzbach, Frankenthal; Ruediger Sens, Mannheim; Heike Kilburg, Speyer, all of Germany

[73] Assignee: BASF Aktiengesellschaft, Ludwigshafen, Germany

[21] Appl. No.: 267,543

[22] Filed: Jun. 29, 1994

Related U.S. Application Data

[62] Division of Ser. No. 65,905, May 25, 1993.

[30] Foreign Application Priority Data

Jun. 4, 1992 [DE] Germany .......... 42 18 359.6

[51] Int. Cl.$^6$ .............. C08F 228/06; C08F 226/06; C08F 224/00; C08F 220/42
[52] U.S. Cl. .................... 526/256; 526/257; 526/258; 526/260; 526/261; 526/265; 526/266; 526/298; 526/299; 526/300; 526/304; 526/305; 526/307; 526/307.6; 526/307.7; 526/307.8; 526/329.2; 526/347
[58] Field of Search .......... 526/265, 256, 257, 258, 526/260, 261, 265, 266, 298, 299, 300, 304, 305, 307, 307.6, 307.7, 307.8, 329.2, 347

[56] References Cited

U.S. PATENT DOCUMENTS 4,619,990 10/1986 Elmasry ..................... 526/219
5,264,507 11/1993 Wiesenfeldt et al. ......... 526/256

Primary Examiner—Joseph L. Schofer
Assistant Examiner—Wu C. Cheng
Attorney, Agent, or Firm—Oblon, Spivak, McClelland, Maier & Neustadt

[57] ABSTRACT

Methine or azamethine dye polymers useful in nonlinear optics contain as characteristic monomer units radicals of the formulae I, II, III and IV

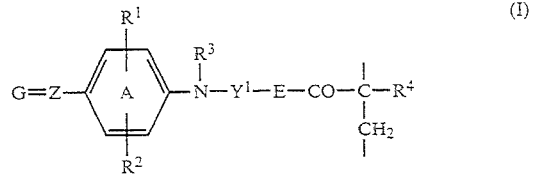

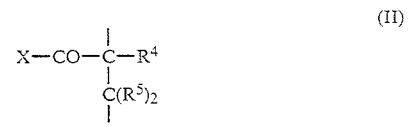

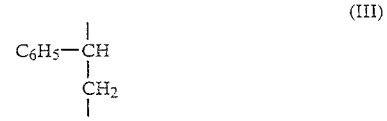

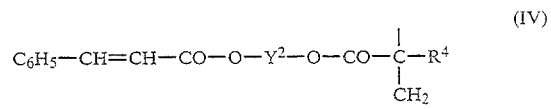

where
G is a divalent organic radical,
Z is nitrogen or CH,
$R^1$ and $R^2$ are each hydrogen, $C_1$–$C_6$-alkyl or substituted or unsubstituted $C_1$–$C_6$-alkoxy,
$R^3$ is hydrogen, $C_1$–$C_6$-alkyl, $C_5$–$C_7$-cycloalkyl or $C_3$–$C_4$-alkenyl,
$R^4$ is hydrogen, deuterium, methyl, trideuterated methyl or chlorine,
$R^5$ is hydrogen or deuterium,
$Y^1$ and $Y^2$ are each $C_2$–$C_{10}$-alkylene,
E is oxygen, imino or $C_1$–$C_4$-alkylimino, and
X is hydroxyl, substituted or unsubstituted $C_1$–$C_6$-alkoxy, phenoxy, amino or $C_1$–$C_4$-mono- or -dialkylamino, and the ring A can be benzofused, and have an average molecular weight of from 1,000 to 100,000.

2 Claims, No Drawings

METHINE OR AZAMETHINE DYE POLYMERS

This is a division, of application Ser. No. 08/065,905, filed on May 25, 1993.

The present invention relates to novel methine or azamethine dye polymers containing as characteristic monomer units radicals of the formulae I, II, III and IV

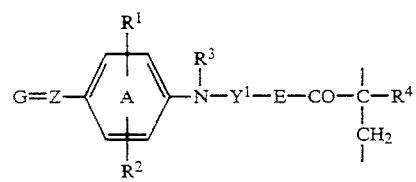

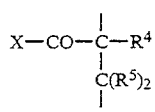

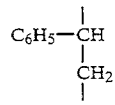

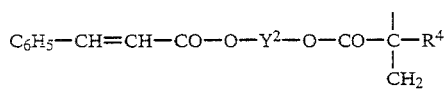

where
- G is a divalent radical of the benzene, naphthalene, pyridine, quinoline, thiazole, benzothiophene, triazolopyridine or methylene series,
- Z is nitrogen or CH,
- $R^1$ and $R^2$ are each independently of the other hydrogen, $C_1$–$C_6$-alkyl or $C_1$–$C_6$-alkoxy optionally substituted by phenyl or $C_1$–$C_4$-alkoxy,
- $R^3$ is hydrogen, $C_1$–$C_6$-alkyl, $C_5$–$C_7$-cycloalkyl or $C_3$–$C_4$-alkenyl,
- $R^4$ is hydrogen, deuterium, methyl, trideuterated methyl or chlorine,
- $R^5$ is hydrogen or deuterium,
- $Y^1$ and $Y^2$ are each independently of the other $C_2$–$C_{11}$-alkylene optionally interrupted by from 1 to 3 oxygen atoms in ether function or imino or $C_1$–$C_4$-alkylimino groups,
- E is oxygen, imino or $C_1$–$C_4$-alkylimino, and
- X is hydroxyl, $C_1$–$C_6$-alkoxy, trideuterated methoxy, 2,3-epoxypropoxy, phenoxy, amino or $C_1$–$C_4$-mono- or -dialkylamino, and the ring A can be benzofused, the proportion of monomer units of the formula I being from 1 to 100 mol %, the proportion of monomer units of the formula II being from 0 to 99 mol %, the proportion of monomer units of the formula III being from 0 to 99 mol % and the proportion of monomer units of the formula IV being from 0 to 75 mol %, each percentage being based on the polymer, and the average molecular weight of the polymer being from 1,000 to 100,000, to the use thereof in nonlinear optics and to the use of monomeric methine or azamethine dyes for preparing the novel polymers.

J. Polymer Sci., Part A, Polymer Chem. 28 (1990), 1–13, discloses polymers with azo dye chromophores in the side chains. The azo dyes in question are members of the azobenzene series. However, it has been found that such polymers are still deficient when used in nonlinear optical systems.

The earlier European Patent Application No. 92116096.6 discloses further azo dye polymers.

Chemical Physics Letters 179 (1991), 551–554, describes the use of specific cyanine dyes in nonlinear optical systems.

It is an object of the present invention to provide novel polymers which have methine or azamethine dyes as chromophore in the side chain and which shall be advantageous for use in nonlinear optical systems.

We have found that this object is achieved by the methine or azamethine dye polymers defined at the beginning.

As regards the propositions of the monomer units, the sum of the monomer units of the formulae I, II, III and IV shall always add up to 100 mol %.

Of particular suitability are methine or azamethine dye polymers of the formula I where G is a radical of the formula

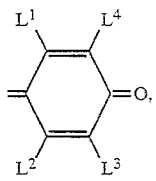
(VIa)

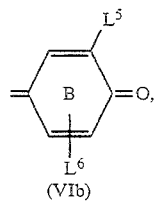
(VIb)

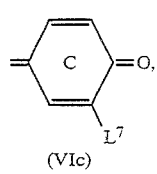
(VIc)

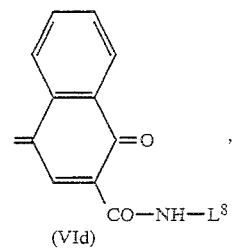
(VId)

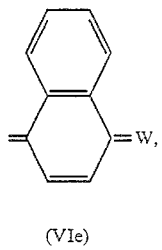
(VIe)

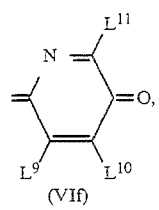
(VIf)

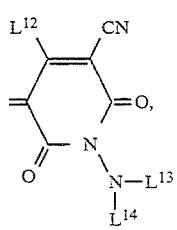
(VIg)

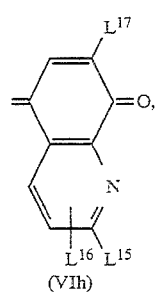
(VIh)

-continued

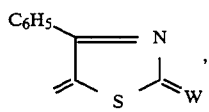 (VIi)

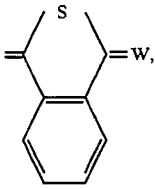 (VIj)

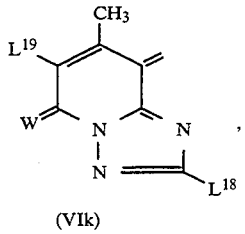 (VIk)

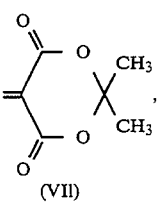 (VII)

=C(CN)₂, (VIm)  =C(CN)(COOL²⁰) (VIn)  or  =C(COOL²⁰)₂ (VIo)

where
the rings B and C can each be benzofused,
L¹, L² and L³ are each independently of the others hydrogen, methyl, fluorine or chlorine,
L⁴ is fluorine or chlorine,
L⁵ is hydrogen, fluorine, chlorine, bromine, hydroxyl, nitro, C₁-C₆-alkyl, cyano, C₁-C₄-alkylsulfonylamino, C₁-C₆-alkoxycarbonyl, C₁-C₄-alkylcarbamoyl or C₂-C₄-alkanoylamino,
L⁶ is hydrogen, fluorine, chlorine, cyano, C₁-C₄-alkylcarbamoyl, C₂-C₄-alkanoylamino, C₁-C₄-alkylureido, C₁-C₄-alkylsulfamoyl or C₁-C₆-alkoxycarbonyl,
L⁷ is a radical of the formula

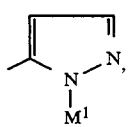

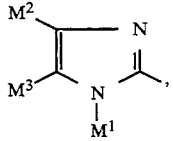

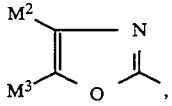

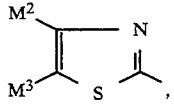

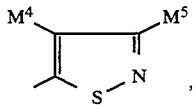

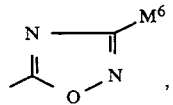

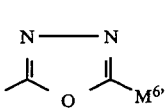

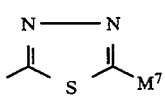

where

M¹ is hydrogen, C₁-C₆-alkyl, benzyl, cyclohexyl, phenyl or tolyl,
M² is hydrogen, chlorine, C₁-C₆-alkyl optionally interrupted by an oxygen atom in ether function, phenyl, C₁-C₆-alkoxy, cyano or C₁-C₆-alkoxycarbonyl, wherein the alkyl group may be interrupted by one or two oxygen atoms in ether function,
M³ is hydrogen, C₁-C₆-alkyl, phenyl, cyano, nitro or C₁-C₆-alkoxycarbonyl, wherein the alkyl group may be interrupted by one or two oxygen atoms in ether function, or M² and M³ together are a fused benzo ring,
M⁴ is hydrogen, chlorine, cyano, nitro or C₁-C₆-alkoxycarbonyl, wherein the alkyl group may be interrupted by one or two oxygen atoms in ether function,
M⁵ is chlorine, C₁-C₆-alkyl optionally interrupted by an oxygen atom in ether function, C₁-C₆-alkoxy or C₁-C₆-alkylthio,
M⁶ is C₁-C₆-alkyl, and
M⁷ is hydrogen, chlorine, cyano, thiocyanato, C₁-C₆-alkyl optionally interrupted by an oxygen atom in ether function, C₁-C₆-alkoxy, C₁-C₆-alkylthio, 2-(C₁-C₂-alkoxycarbonyl)ethylthio or C₁-C₆-alkoxycarbonyl,
wherein the alkyl group may be interrupted by one or two oxygen atoms in ether function,
L⁸ is a radical of the formula

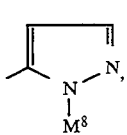

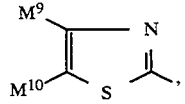

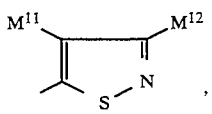

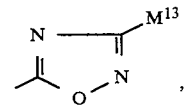

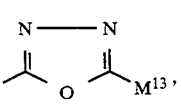

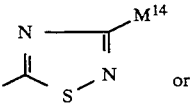

where
M¹ is C₁-C₆-alkyl or cyclohexyl,
M⁹ is hydrogen, chlorine, C₁-C₆-alkyl optionally interrupted by 1 oxygen atom in ether function, C₁-C₆-alkoxy or C₁-C₆-alkoxycarbonyl, wherein the alkyl group may be interrupted by 1 or 2 oxygen atoms in ether function,
M¹⁰ is hydrogen, C₁-C₆-alkyl, cyano, nitro or C₁-C₆-alkoxycarbonyl, wherein the alkyl group may be interrupted by 1 or 2 oxygen atoms in ether function,
M¹¹ is hydrogen, chlorine, cyano, nitro or C₁-C₆-alkoxycarbonyl, wherein the alkyl group may be interrupted by 1 or 2 oxygen atoms in ether function,
M¹² is chlorine, C₁-C₆-alkyl optionally interrupted by 1 oxygen atom in ether function, C₁-C₆-alkoxy or C₁-C₆-alkylthio, $M^{13}$ is $C_1$-$C_6$-alkyl, and $M^{14}$ is hydrogen, chlorine, cyano, thiocyanato, $C_1$-$C_6$-alkyl optionally interrupted by 1 oxygen atom in ether function, $C_1$-$C_6$-alkoxy, $C_1$-$C_6$-alkylthio, 2-($C_1$-$C_2$-alkoxycarbonyl)ethylthio or $C_1$-$C_6$-alkoxycarbonyl, wherein the alkyl group may be interrupted by 1 or 2 oxygen atoms in ether function, $L^9$ is hydrogen, fluorine, chlorine, methyl or a radical of the formula —NH—CO—$B^1$, —NH—CO—$OB^1$, —NH—CO—$NB^1B^2$, NH—CS—$OB^1$, —NH—CS—$B^1B^2$, —NH—$SO_2$—$B^1$ or —NH—$SO_2$—$NB^1B^2$, where $B^1$ and $B^2$ are each independently of the other $C_1$-$C_4$-alkyl, $L^{10}$ is hydrogen, fluorine or chlorine or $L^9$ and $L^{10}$ together are a fused benzo ring, $L^{11}$ is a radical of the formula —CO—$OB^1$, —CO—$NHB^1$, —CO—NH—CO—$B^1$, —NH—CO—$B^1$, —NH—CO—$OB^1$, —NH—CO—$NB^1B^2$, —NH—CS—$OB^1$, —NH—CS—$B^1B^2$, —NH—$SO_2$—$B^1$ or —NH—$SO_2$—$NB^1B^2$, where $B^1$ and $B^2$ are each as defined above, $L^{12}$ is hydrogen or $C_1$-$C_4$-alkyl, $L^{13}$ and $L^{14}$ are each independently of the other hydrogen, $C_1$-$C_{12}$-alkyl, $C_5$-$C_7$-cycloalkyl, phenyl, pyridyl, $C_1$-$C_6$-alkanoyl, $C_1$-$C_6$-alkoxycarbonyl, $C_1$-$C_6$-alkylsulfonyl, $C_5$-$C_7$-cycloalkylsulfonyl, phenylsulfonyl, pyridylsulfonyl, benzoyl, pyridylcarbonyl or thienylcarbonyl, or $R^2$ and $R^3$ are combined with the nitrogen atom joining them together into a five- or six-membered saturated heterocyclic radical which optionally contains further hetero atoms, $L^{15}$ is hydrogen or $C_1$-$C_6$-alkyl, $L^{16}$ is hydrogen, fluorine, chlorine or bromine, $L^{17}$ is fluorine, chlorine or bromine, $L^{18}$ is $C_1$-$C_{12}$-alkyl which may be interrupted by from one to three oxygen atoms in ether function, phenyl or hydroxyl, $L^{19}$ is cyano, carbamoyl, carboxyl or $C_1$-$C_6$-alkoxycarbonyl, $L^{20}$ is $C_1$-$C_6$-alkyl or $C_2$-$C_4$-alkenyl and W is oxygen or a radical of the formula

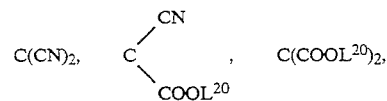

where $L^{20}$ is in each case as defined above.

Any alkyl, alkylene or alkenyl groups appearing in the abovementioned formulae may be not only straight-chain but also branched.

$R^1$, $R^2$, $R^3$, $L^5$, $L^{13}$, $L^{14}$, $L^{15}$, $L^{18}$, $L^{20}$, $M^1$, $M^2$, $M^3$, $M^5$, $M^6$, $M^7$, $M^8$, $M^9$, $M^{10}$, $M^{12}$, $M^{13}$, $M^{14}$, $B^1$ and $B^2$ are each for example methyl, ethyl, propyl, isopropyl, butyl, isobutyl, sec-butyl, pentyl, isopentyl, neopentyl, tertpentyl, hexyl or 2-methylpentyl.

$L^{13}$, $L^{14}$ and $L^{18}$ are each for example heptyl, octyl, 2-ethylhexyl, isooctyl, nonyl, isononyl, decyl, isodecyl, undecyl or dodecyl (the above designations isooctyl, isononyl and isodecyl are trivial names derived from the oxo process alcohols—cf. Ullmanns Encyklopädie der technischen Chemie, 4th edition, volume 7, pages 215 to 217, and volume 11, pages 435 and 436).

$M^6$, $M^7$, $M^{12}$ and $M^{14}$ are each for example methylthio, ethylthio, propylthio, isopropylthio, butylthio, isobutylthio, pentylthio, hexylthio.

$M^2$, $M^6$, $M^7$, $M^9$, $M^{12}$, $M^{14}$ and X are each for example methoxy, ethoxy, propoxy, isopropoxy, butoxy, isobutoxy, sec-butoxy, pentyloxy, isopentyloxy, neopentyloxy, tertpentyloxy, hexyloxy or 2-methylpentyloxy.

$L^{13}$ and $L^{14}$ are each for example methylsulfonyl, ethylsulfonyl, propylsulfonyl, isopropylsulfonyl, butylsulfonyl, isobutylsulfonyl, sec-butylsulfonyl, pentylsulfonyl, isopentylsulfonyl, neopentylsulfonyl or hexylsulfonyl.

$L^5$, $L^6$, $L^{13}$, $L^{14}$, $L^{19}$, $M^2$, $M^3$, $M^4$, $M^9$, $M^{10}$, $M^{11}$ and $M^{14}$ are each for example methoxycarbonyl, ethoxycarbonyl, propoxycarbonyl, isopropoxycarbonyl, butoxycarbonyl, isobutoxycarbonyl, sec-butoxycarbonyl, pentyloxycarbonyl or hexyloxycarbonyl.

$M^2$, $M^3$, $M^4$, $M^7$, $M^9$, $M^{10}$, $M^{11}$ and $M^{14}$ are each for example 2-methoxyethoxycarbonyl, 2-ethoxyethoxycarbonyl, 3,6-dioxaheptyloxycarbonyl or 3,6-dioxaoctyloxycarbonyl.

$R^1$ and $R^2$ are each for example 2-methoxyethoxy, 2-ethoxyethoxy, 2- or 3-methoxypropoxy, 2- or 3-ethoxypropoxy, 2- or 4-methoxybutoxy, 2- or 4-ethoxybutoxy, 5-methoxypentyloxy, 5-ethoxypentyloxy, 6-methoxyhexyloxy, 6-ethoxyhexyloxy, benzyloxy or 1- or 2-phenylethoxy.

X is for example methylamino, ethylamino, propylamino, isopropylamino, butylamino, dimethylamino, diethylamino, dipropylamino, diisopropylamino, dibutylamino or N-methyl-N-ethylamino.

$M^7$ and $M^{14}$ are each for example 2-methoxycarbonylethylthio or 2-ethoxycarbonylethylthio.

$R^3$, $L^{13}$ and $L^{14}$ are each for example cyclopentyl, cyclohexyl or cycloheptyl.

$R^3$ and $L^{20}$ are each for example allyl or methallyl.

$Y^1$ and $Y^2$ are each for example $(CH_2)_2$, $(CH_2)_3$, $(CH_2)_4$, $(CH_2)_5$, $(CH_2)_6$, $(CH_2)_7$, $(CH_2)_8$, $(CH_2)_9$, $(CH_2)_{10}$, $(CH_2)_{11}$, $CH(CH_3)$—$CH_2$, $CH(CH_3)$—$CH(CH_3)$, $C_2H_4$—O—$C_2H_4$, $C_2H_4$—NH—$C_2H_4$, $C_2H_4$—N($CH_3$)—$C_2H_4$, $C_2H_4O$—$C_2H_4$—O—$C_2H_4$, $C_2H_4$—NH—$C_2H_4$—NH—$C_2H_4$ or $C_2H_4$—N($CH_3$)—$C_2H_4$—N($CH_3$)—$C_2H_4$.

E is for example methylimino, ethylimino, propylimino, isopropylimino or butylimino.

$L^{13}$ and $L^{14}$ are each for example formyl, acetyl, propionyl, butyryl, pentanoyl or hexanoyl.

$L^5$ is for example methylsulfonylamino, ethylsulfonylamino, propylsulfonylamino, isopropylsulfonylamino or butylsulfonylamino.

$L^5$ and $L^6$ are each for example methylcarbamoyl, ethylcarbamoyl, propylcarbamoyl, isopropylcarbamoyl, butylcarbamoyl, acetylamino, propionylamino or butyrylamino.

$L^6$ is for example methylureido, ethylureido, propylureido, isopropylureido, butylureido, methylsulfamoyl, ethylsulfamoyl, propylsulfamoyl, isopropylsulfamoyl or butylsulfamoyl.

$M^2$, $M^3$, $M^7$, $M^9$, $M^{12}$, $M^{14}$ and $L^{18}$ are each for example 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 4-methoxybutyl or 2- or 4-ethoxybutyl.

$L^{18}$ is for example 2- or 3-butoxypropyl, 2- or 4-butoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 4,8-dioxadecyl, 3,6,8-trioxadecyl or 3,6,9-trioxaundecyl.

$L^{13}$ combined with $L^{14}$ and the nitrogen joining them together to form a five- or six-membered saturated heterocyclic radical which optionally contains further hetero atoms may be for example pyrrolidinyl, piperidinyl, morpholinyl, piperazinyl or N-($C_1$–$C_4$-alkyl)-piperazinyl.

Preference is given to methine or azamethine dye polymers containing as characteristic monomer units radicals of the formula Ia

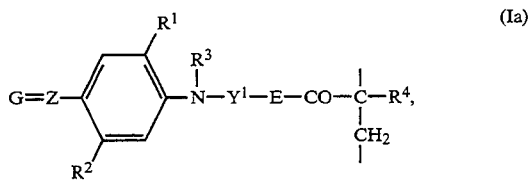

where G, Z, $R^1$, $R^3$, $R^4$, Y and E are each as defined above, and of the abovementioned formula II.

Preference is further given to methine or azamethine dye polymers in which the proportion of monomer units of the formula I is from 4 to 50, in particular from 8 to 25, mol %, that of the formula II from 51 to 96, in particular from 75 to 92, mol %, that of the formula III from 0 to 30, in particular from 0 to 15, mol and that of the formula IV from 0 to 50, in particular from 0 to 20, mol %, each percentage being based on the polymer, and the average molecular weight of the polymer is from 1500 to 50,000, in particular from 2000 to 25,000.

Of particular suitability are methine or azamethine dye polymers in which in the formula I
 $R^1$ and $R^2$ are each independently of the other hydrogen, $C_1$–$C_4$-alkyl or $C_1$–$C_4$-alkoxy,
 $R^3$ is $C_1$–$C_4$-alkyl,
 $R^4$ is hydrogen or methyl, and
 E is $C_2$–$C_8$-alkylene, and in the formula II
 $R^4$ is hydrogen or methyl, and
 X is $C_1$–$C_4$-alkoxy.

To prepare the polymers of the invention, it is advantageous to employ methine or azamethine dyes of the formula V

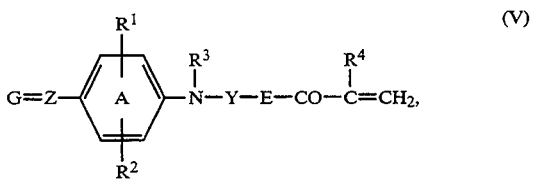

where G, Z, $R^1$, $R^2$, $R^3$, $R^4$, Y, E and the ring A are each as defined above.

The novel polymers can be prepared by methods known per se, for example as described in J. Polymer Sci. (loc. cit.).

Conveniently, a methine or azamethine dye of the formula V is reacted with an acryloyl compound of the formula VIII

where $R^4$ and X are each as defined above, styrene and a cinnamic ester of the formula IX

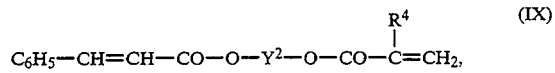

where $Y^2$ and $R^4$ are each as defined above, in the above-mentioned molar ratio in an inert solvent (for example toluene or xylene) in the presence of a free radical initiator (for example azobisisobutyronitrile).

The methine or azamethine dyes of the formula V are known per se and described for example in EP-A-416 434 or EP-A-449 109, or in the earlier Patent Applications EP-A-479 068, EP-A-479 076, EP-A-480 252, EP-A-480 281 or WO-A-92 19 684, or can be obtained by the methods mentioned therein.

The methine or azamethine dye polymers of the invention are particularly suitable for use in nonlinear optical systems (see for example Chemistry and Industry, Oct. 1, 1990, pages 600–608).

They are particularly suitable for use in communications technology, electrooptical modulators (for example Mach-Zehnder interferometers), optical switches, frequency mixing or waveguides.

The layers which contain the polymers of the invention are prepared in a conventional manner, for example by wet coating (spincoating) with a 5–15% by weight solution of the polymer in a solvent (eg. tetrachloroethane, methylene chloride or tetrahydrofuran).

Given a suitable substitution pattern (for example an epoxy structure) the novel polymers can also be crosslinked photochemically, thermally or by the action of electron beams.

The novel polymers are notable for good processibility into thin films, high purity, a narrow molecular weight distribution, good orientation in an electric field, good long-term stability, high glass transition temperatures and a high electro-optical coefficient.

The Examples which follow will further illustrate the invention.

I. Preparation of monomeric methine or azamethine dyes

EXAMPLE 1 a) 25 ml of a 40% strength by weight aqueous sodium nitrite solution were added dropwise at from 0° to 5° C. to a solution of 23.5 g of N-ethyl-N-(6-hydroxyhexyl)-m-toluidine in 100 ml of water and 20 ml of concentrated hydrochloric acid. After diazotization was complete (TLC), 40 g of sodium chloride were added and the mixture was brought to pH 9 with 24 ml of 25% strength by weight aqueous ammonia solution. Then 100 ml of ethyl acetate were added and thoroughly stirred in. The organic phase was separated off, dried and stripped of solvent.

b) The resulting oil (22.4 g) was dissolved in 100 ml of methanol and hydrogenated under normal conditions with hydrogen in the presence of 3 g of Raney nickel in the course of 4 hours. Then the catalyst was filtered off.

c) A quarter of the reaction mixture was admixed with 5.6 g of the compound of the formula

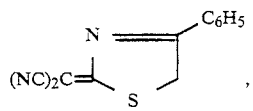

dissolved in 75 ml of ethyl acetate and 50 ml of ethanol, followed by a solution of 15 g of sodium carbonate in 75 ml of water.

The resulting solution was admixed at from 25° to 30° C. with a solution of 13.5 g of ammonium peroxodisulfate in 75 ml of water added dropwise. This was followed by one hour of stirring, filtration with suction, washing with 1.5 l of water and drying under reduced pressure. This left 8.5 g of the dye of the formula

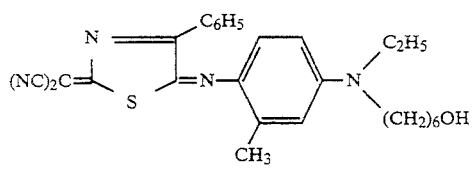

d) 8.5 g of the dye obtained under c) were dissolved in 100 ml of methylene chloride and admixed with 4.2 ml triethylamine and 0.24 g of hydroquinone. This solution was admixed at from 0 to 5° C. with a solution of 2.0 g of methacryloyl chloride in 25 ml of methylene chloride, added dropwise, and stirred at 0° to 5° C. for 2 hours and then at room temperature for 12 hours. The reaction mixture was extracted twice with 50 ml of saturated sodium bicarbonate and 50 ml of saturated sodium carbonate solution. The organic phase was dried over sodium sulfate and stripped of the solvent. The residue was purified by column chromatography over silica gel with 8:1 v/v hexane/acetone as mobile phase. This yielded 4.9 g of the dye of the formula

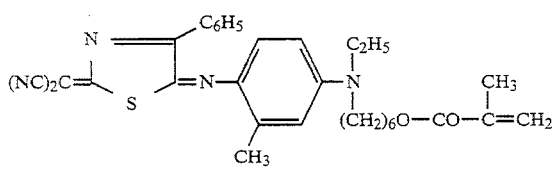

EXAMPLE 2 a) A solution of 153 g of N-methylaniline in 750 ml of n-butanol was admixed with 200 g of potassium carbonate and 6 g of potassium iodide. Then 200 g of 6-chlorohexanol were added at room temperature in the course of 30 minutes. This was followed by refluxing for 24 hours, cooling down to room temperature, removal of salt and stripping of solvent. The residue was distilled. This yielded 196 g of N-methyl-N-(6-hydroxyhexyl)aniline. Boiling point: 158° C./0.7 mbar.

b) A solution of 103.5 g of N-methyl-N-(6-hydroxyhexyl)aniline in 1000 ml of methylene chloride was admixed at from 0° to 5° C. with 105 ml of triethylamine and 6 g of hydroquinone and then with a solution of 104.5 g of methacryloyl chloride in 200 ml of methylene chloride. The reaction mixture was subsequently stirred at from 0° to 5° C. for 2 hours and at room temperature for 12 hours. It was then extracted twice with 500 ml of saturated sodium bicarbonate and 500 ml of saturated sodium carbonate solution. The organic phase was dried over sodium sulfate and stripped of solvent. This yielded 180 g of an oily product of the formula

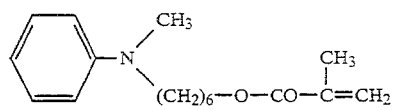

This oil was diluted with sufficient N,N-dimethylformamide until the weight of the solution was 250 g.

c) 10.64 g of phosphoryl trichloride were added dropwise at from 0° to 5° C. to 400 ml of N,N-dimethylformamide. This was followed by stirring at from 0° to 5° C. for 2 hours. The resulting solution was added dropwise to 25 g of the solution obtained under b). The reaction mixture was then heated to 90° C. for 3 hours, cooled down, poured into 300 ml of ice-water and adjusted to pH 5 with sodium acetate. The solution was extracted with 100 ml of methylene chloride, and the organic phase was dried over sodium sulfate and stripped of solvent. The residue was purified by column chromatography over silica gel using 5:4 v/v toluene/ethyl acetate. This yielded 10.2 g of the product of the formula

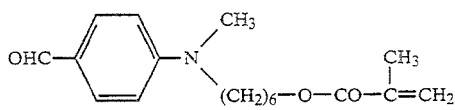

d) 3 g of the compound described under c) and 1.9 g of the compound of the formula

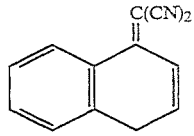

were added to 50 ml of acetic anhydride and refluxed until the reaction had ended (TLC). The mixture was then cooled down and admixed with 100 ml of isopropanol, and the precipitate was separated off. After removal of the solvent the residue was purified by column chromatography over silica gel using 2:1 v/v toluene/ethyl acetate. This yielded 1.3 g of the dye of the formula

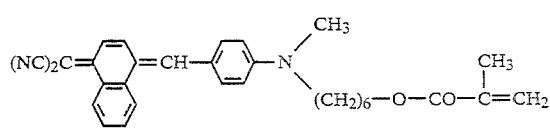

The procedures of Example 1 and 2 can be used to obtain the products listed below in Table 1.

TABLE 1

| Ex. No. | Formula |
|---|---|
| 3 | (structure) |
| 4 | (structure) |
| 5 | (structure) |
| 6 | (structure) |
| 7 | (structure) |
| 8 | (structure) |
| 9 | (structure) |

TABLE 1-continued

| Ex. No. | Formula |
|---------|---------|
| 10 | (chemical structure: dicyanomethylene-thiazole with phenylimine bearing N(C₂H₅)(CH₂)₆—O—CO—C(CH₃)=CH₂ and H₃C substituent) |
| 11 | (H₂C=CH—CH₂—O—OC—)₂C=N—C₆H₃(CH₃)—N(C₂H₅)(CH₂)₆—O—CO—C(CH₃)=CH₂ |
| 12 | (dicyanovinyl-phenyl with N(C₂H₅)(CH₂)₆—O—CO—C(CH₃)=CH₂ and H₃C) |
| 13 | (dicyanomethylene-thiazole with ethyl substituent, methylidene linker to phenyl bearing CH₃, N(CH₃)(CH₂)₆—O—CO—C(CH₃)=CH₂) |
| 14 | (dicyanomethylene-thiazole with C₆H₅ substituent, methylidene to phenyl bearing CH(CH₃)₂, N(C₄H₉)(CH₂)₄—O—CO—C(CH₃)=CH₂) |
| 15 | (dicyanomethylene-benzothiophene-imine with phenyl, N(C₄H₉)(CH₂)₄—O—CO—C(CH₃)=CH₂ and CH(CH₃)₂) |
| 16 | (pyridone-triazole system with CN, CH₃, N= linker to phenyl bearing N(C₄H₉)(CH₂)₄—O—CO—C(CH₃)=CH₂, CH(CH₃)₂; triazole bears H₉C₄—CH—C₂H₅) |
| 17 | (pyridone-dione with NC, CH₃, =CH— to phenyl with N(C₄H₉)(CH₂)₄—O—CO—C(CH₃)=CH₂, CH(CH₃)₂; N—HN—CO—CH(C₄H₉)(C₂H₅)) |

TABLE 1-continued

| Ex. No. | Formula |
|---|---|
| 18 | |
| 19 | |
| 20 | |

II. Preparation of polymer

General polymerization method for preparing polyacrylates of the following formula:

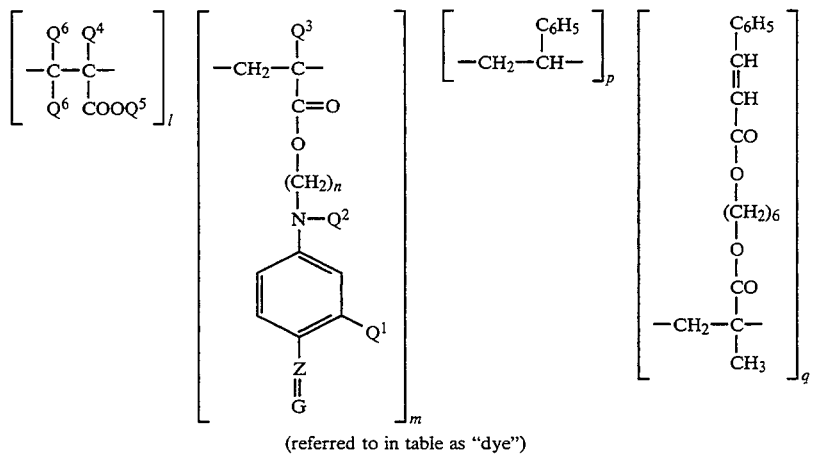

(referred to in table as "dye")

(The indices l, m, p and q express the mole percentages of the respective monomer units, based on the polymer.)

In a Schlenk vessel, a monomer solution comprising m mol % of dye monomer and l+p+q mol % of comonomer in absolute toluene was admixed with 2 mol % of azobisisobutyronitrile. After argon had been passed through the monomer mixture for 10 minutes, the monomer mixture was thermostabilized at 50° C. The polymerization reaction was complete after 100 hours. The polymers were precipitated with methanol and reprecipitated twice from hexane/methanol. (If monomer is still present, it can be separated off by column chromatography over silica gel, for example using 9:1 v/v toluene/ethyl acetate as mobile phase.) After the solvent had been removed, the polymer was dried in a high vacuum. The quantitative composition of the copolymers was determined by UV spectroscopy and elemental analysis. The molecular weights were determined by gel permeation chromatography. The glass transition temperature of the polymer was determined by differential calorimetry.

TABLE 2

| Example No. | l | m | p | q | $Q^4$ | $Q^5$ | $Q^6$ | Dye of Ex. No. | Average molecular weight | $T_G$ [°C.] |
|---|---|---|---|---|---|---|---|---|---|---|
| 21 | 90 | 10 | — | — | $CH_3$ | $CH_3$ | H | 3 | 13,415 | 85 |
| 22 | 90 | 10 | — | — | $CH_3$ | $CH_3$ | H | 1 | 6,200 | 125 |
| 23 | 90 | 10 | — | — | $CH_3$ | $CH_3$ | H | 4 | 9,400 | 120 |

The suitability of the methine or azamethine dyes for use in nonlinear optical systems was determined by solvatochromatic methods, as described in J.Org. Chem. 54 (1989), 3774–3778, and the references cited therein.

We claim:

1. A method for providing a nonlinear optical effect comprising, providing a nonlinear optical element comprising:

methine or azamethine dye polymers containing as characteristic monomer units radicals of the formulae I, II, III and IV

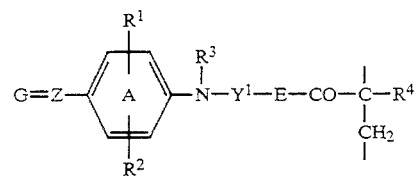

(I)

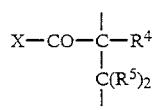

(II)

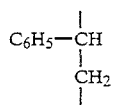

(III)

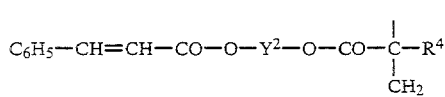

(IV)

where

G is a divalent radical of the formula

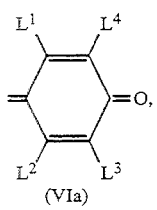
(VIa)

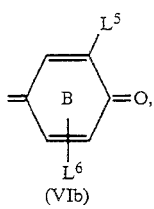
(VIb)

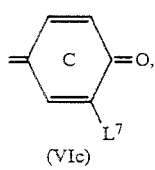
(VIc)

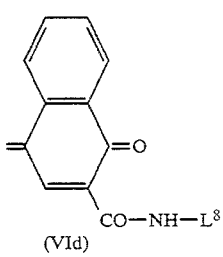
(VId)

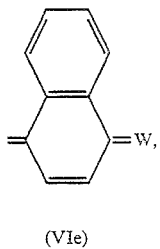
(VIe)

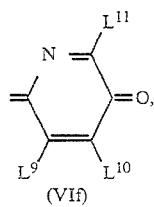
(VIf)

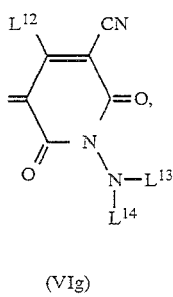
(VIg)

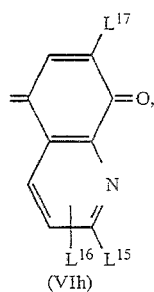
(VIh)

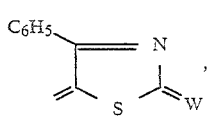
(VIi)

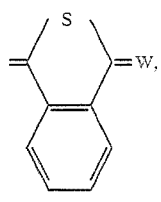
(VIj)

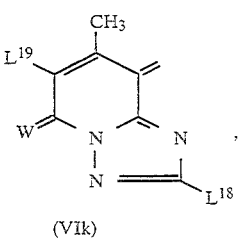
(VIk)

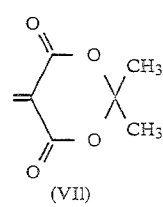
(VIl)

$=C(CN)_2$,  $=C\begin{smallmatrix}CN\\COOL^{20}\end{smallmatrix}$  or  $=C(COOL^{20})_2$ (VIm)  (VIn)  (VIo)

where the rings B and C can each be benzofused, $L^1$, $L^2$ and $L^3$ are each independently of the others hydrogen, methyl, fluorine or chlorine, $L^4$ is fluorine or chlorine, $L^5$ is hydrogen, fluorine, chlorine, bromine, hydroxyl, nitro, $C_1$–$C_6$-alkyl, cyano, $C_1$–$C_4$-alkylsulfonylamino, $C_1$–$C_6$-alkoxycarbonyl, $C_1$–$C_4$-alkylcarbamoyl or $C_2$–$C_4$-alkanoylamino, $L^6$ is hydrogen, fluorine, chlorine, cyano, $C_1$–$C_4$-alkylcarbamoyl, $C_2$–$C_4$-alkanoylamino, $C_1$–$C_4$-alkylureido, $C_1$–$C_4$-alkylsulfamoyl or $C_1$–$C_6$-alkoxycarbonyl, $L^7$ is a radical of the formula

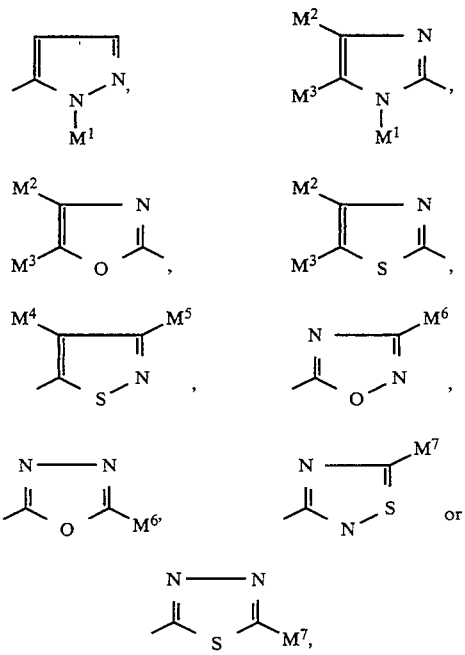

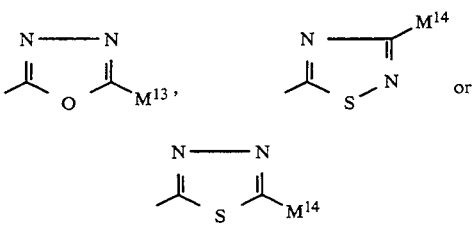

where

M[1] is hydrogen, $C_1$–$C_6$-alkyl, benzyl, cyclohexyl, phenyl or tolyl,

M[2] is hydrogen, chlorine, $C_1$–$C_6$-alkyl optionally interrupted by an oxygen atom in ether function, phenyl, $C_1$–$C_6$-alkoxy, cyano or $C_1$–$C_6$-alkoxycarbonyl, wherein the alkyl group may be interrupted by one or two oxygen atoms in ether function, M[3] is hydrogen, $C_1$–$C_6$-alkyl, phenyl, cyano, nitro or $C_1$–$C_6$-alkoxycarbonyl, wherein the alkyl group may be interrupted by one or two oxygen atoms in ether function, or M[2] and M[3] together are a fused benzo ring, M[4] is hydrogen, chlorine, cyano, nitro or $C_1$–$C_6$-alkoxycarbonyl, wherein the alkyl group may be interrupted by one or two oxygen atoms in ether function, M[5] is chlorine, $C_1$–$C_6$-alkyl optionally interrupted by an oxygen atom in ether function, $C_1$–$C_6$-alkoxy or $C_1$–$C_6$-alkylthio, M[6] is $C_1$–$C_6$-alkyl, and M[7] is hydrogen, chlorine, cyano, thiocyanato, $C_1$–$C_6$-alkyl optionally interrupted by an oxygen atom in ether function, $C_1$–$C_6$-alkoxy, $C_1$–$C_6$-alkylthio, 2-($C_1$–$C_2$-alkoxycarbonyl)ethylthio or $C_1$–$C_6$-alkoxycarbonyl, wherein the alkyl group may be interrupted by one or two oxygen atoms in ether function, L[8] is a radical of the formula

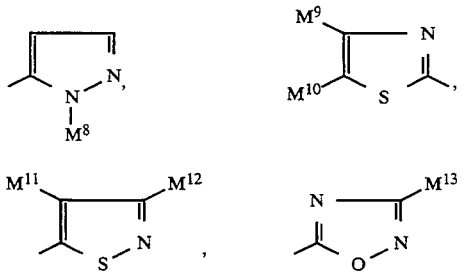

where

M[8] is $C_1$–$C_6$-alkyl or cyclohexyl,

M[9] is hydrogen, chlorine, $C_1$–$C_6$alkyl optionally interrupted by 1 oxygen atom in ether function, $C_1$–$C_6$-alkoxy or $C_1$–$C_6$-alkoxycarbonyl, wherein the alkyl group may be interrupted by 1 or 2 oxygen atoms in ether function, M[10] is hydrogen, $C_1$–$C_6$-alkyl, cyano, nitro or $C_1$–$C_6$-alkoxycarbonyl, wherein the alkyl group may be interrupted by 1 or 2 oxygen atoms in ether function, M[11] is hydrogen, chlorine, cyano, nitro or $C_1$–$C_6$-alkoxycarbonyl, wherein the alkyl group may be interrupted by 1 or 2 oxygen atoms in ether function, M[12] is chlorine, $C_1$–$C_6$-alkyl optionally interrupted by 1 oxygen atom in ether function, $C_1$–$C_6$-alkoxy or $C_1$–$C_6$-alkylthio, M[13] is $C_1$–$C_6$-alkyl, and M[14] is hydrogen, chlorine, cyano, thiocyanato, $C_1$–$C_6$-alkyl optionally interrupted by 1 oxygen atom in ether function, $C_1$–$C_6$-alkoxy, $C_1$–$C_6$-alkylthio, 2-($C_1$–$C_2$-alkoxycarbonyl) ethylthio or $C_1$–$C_6$-alkoxycarbonyl, wherein the alkyl group may be interrupted by 1 or 2 oxygen atoms in ether function, L[9] is hydrogen, fluorine, chlorine, methyl or a radical of the formula
—NH—CO—B[1], —NH—CO—OB[1], —NH—CO—NB[1]B[2], NH—CS—OB[1],
—NH—CS—B[1]B[2], —NH—SO$_2$—B[1] or —NH—SO$_2$—NB[1]B[2], where B[1] and B[2] are independently of the other $C_1$–$C_4$-alkyl, L[10] is hydrogen, fluorine or chlorine or L[9] and L[10] together are a fused benzo ring, L[11] is a radical of the formula
—CO—OB[1], —CO—NHB[1], —CO—NH—CO—B[1], —NH—CO—B[1],
—NH—CO—OB[1], —NH—CO—NB[1]B[2], —NH—CS—OB[1], —NH—CS—B[1]B[2],
—NH—SO$_2$—B[1] or —NH—SO$_2$—NB[1]B[2], where B[1] and B[2] are each as defined above, L[12] is hydrogen or $C_1$–$C_4$-alkyl, L[13] and L[14] are each independently of the other hydrogen, $C_1$–$C_{12}$-alkyl, $C_5$–$C_7$-cycloalkyl, phenyl, pyridyl, $C_1$–$C_6$-alkanoyl, $C_1$–$C_6$-alkoxycarbonyl, $C_1$–$C_6$-alkylsulfonyl, $C_5$–$C_7$-cycloalkylsulfonyl, phenylsulfonyl, pyridylsulfonyl, benzoyl, pyridylcarbonyl or thienylcarbonyl, or R[2] and R[3] are combined with the nitrogen atom joining them together into a five- or six-membered saturated heterocyclic radical which optionally contains further hetero atoms, L[15] is hydrogen or $C_1$–$C_6$ alkyl, $L^{16}$ is hydrogen, fluorine, chlorine or bromine, $L^{17}$ is fluorine, chlorine or bromine, $L^{18}$ is $C_1$–$C_{12}$-alkyl which may be interrupted by from one to three atoms in ether function, phenyl or hydroxyl, $L^{19}$ is cyano, carbamoyl, carboxy or $C_1$–$C_6$-alkoxycarbonyl, $L^{20}$ is $C_1$–$C_6$-alkyl or $C_3$–$C_4$-alkenyl and W is oxygen or a radical of the formula

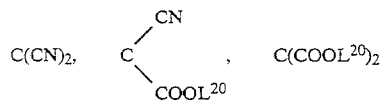

where $L^{20}$ in each case has the abovementioned meanings;

Z is nitrogen or CH, $R^1$ and $R^2$ are each, independently of the other, hydrogen, $C_1$–$C_6$-alkyl or $C_1$–$C_6$-alkoxy optionally substituted by phenyl or $C_1$–$C_4$-alkoxy, is hydrogen, $C_1$–$C_6$-alkyl, $C_5$–$C_7$-cycloalkyl or $C_3$–$C_4$-alkenyl, $R^4$ is hydrogen, deuterium, methyl, trideuterated methyl or chlorine, $R^5$ is hydrogen or deuterium, $Y^1$ and $Y^2$ are each, independently of the other, $C_2$–$C_{11}$-alkylene optionally interrupted by from 1 to 3 oxygen atoms in ether function or imino or $C_1$–$C_4$-alkylimino groups, E is oxygen, imino or $C_1$–$C_4$-alkylimino, and X is hydroxyl, $C_1$–$C_6$-alkoxy, trideuterated methoxy, 2,3-epoxypropoxy, phenoxy, amino or $C_1$–$C_4$-mono- or -dialkylamino, and the ring A can be benzofused, the proportion of monomer units of the formula I being from 1 to 100 mol %, the proportion of monomer units of the formula II being from 0 to 99 mol %, the proportion of monomer units of the formula III being from 0 to 99 mol % and the proportion of monomer units of the formula IV being from 0 to 75 mol %, each percentage being based on the polymer, and the average molecular weight of the polymer being from 1,000 to 100,000, and contacting said nonlinear optical element with light.

2. A method for preparing methine or azamethine dye polymers, comprising reacting one or more monomers wherein said one or more monomers are selected to provide a polymer containing as characteristic monomer units radicals of the formulae I, II, III and IV

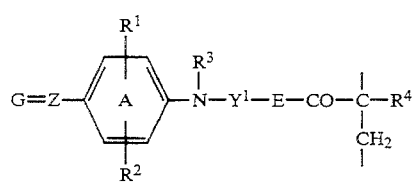

(I)

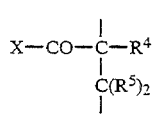

(II)

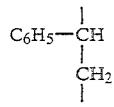

(III)

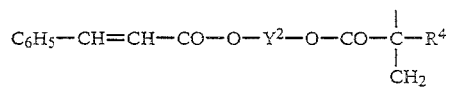

(IV)

where

G is a divalent radical of the formula

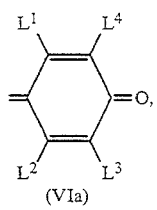
(VIa)

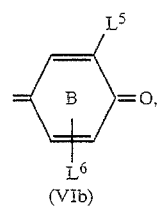
(VIb)

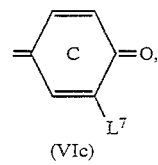
(VIc)

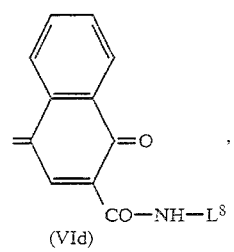
(VId)

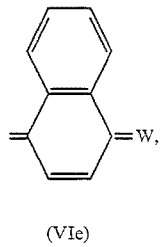
(VIe)

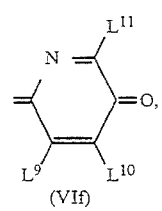
(VIf)

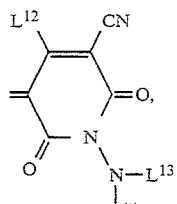
(VIg)

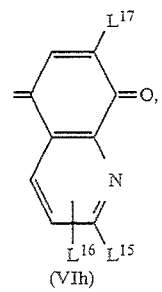
(VIh)

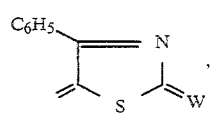
(VIi)

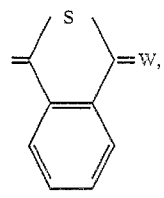
(VIj)

-continued

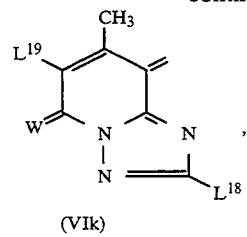 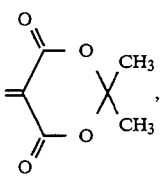

(VIk) (VII)

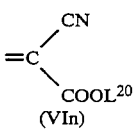 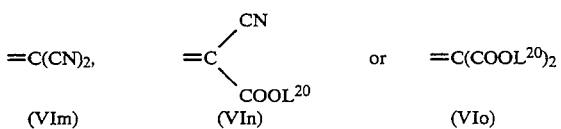

(VIm) (VIn) (VIo)

where the rings B and C can each be benzofused, $L^1$, $L^2$ and $L^3$ are each independently of the others hydrogen, methyl, fluorine or chlorine, $L^4$ is fluorine or chlorine, is hydrogen, fluorine, chlorine, bromine, hydroxyl, nitro, $C_1$-$C_6$-alkyl, cyano, $C_1$, -$C_4$-alkylsulfonylamino, $C_1$-$C_6$-alkoxycarbonyl, $C_1$-$C_4$-alkylcarbamoyl or $C_2$-$C_4$-alkanoylamino, $L^6$ is hydrogen, fluorine, chlorine, cyano, $C_1$-$C_4$-alkylcarbamoyl, $C_2$-$C_4$-alkanoylamino, $C_1$-$C_4$-alkylureido, $C_1$-$C_4$-alkylsulfamoyl or $C_1$-$C_6$-alkoxycarbonyl, $L^7$ is a radical of the formula

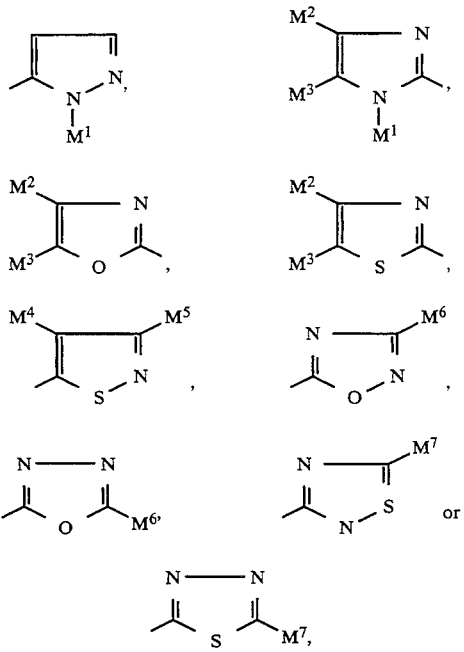

where $M^1$ is hydrogen, $C_1$-$C_6$-alkyl, benzyl, cyclohexyl, phenyl or tolyl, $M^2$ is hydrogen, chlorine, $C_1$-$C_6$-alkyl optionally interrupted by an oxygen atom in ether function, phenyl, $C_1$-$C_6$-alkoxy, cyano or $C_1$-$C_6$-alkoxycarbonyl, wherein the alkyl group may be interrupted by one or two oxygen atoms in ether function, $M^3$ is hydrogen $C_1$-$C_6$-alkyl, phenyl, cyano, nitro or $C_1$-$C_6$-alkoxycarbonyl, wherein the alkyl group may be interrupted by one or two oxygen atoms in ether function, or $M^2$ and $M^3$ together are a fused benzo ring, $M^4$ is hydrogen, chlorine, cyano, nitro or $C^1$-$C_6$-alkoxycarbonyl, wherein the alkyl group may be interrupted by one or two oxygen atoms in ether function, $M^5$ is chlorine, $C_1$-$C_6$-alkyl optionally interrupted by an oxygen atom in ether function, $C_1$-$C_6$-alkoxy or $C_1$-$C_6$-alkylthio, $M^6$ is $C_1$-$C_6$-alkyl, and $M^7$ is hydrogen, chlorine, cyano, thiocyanato, $C_1$-$C_6$-alkyl optionally interrupted by an oxygen atom in ether function, $C_1$-$C_6$-alkoxy, $C_1$-$C_6$-alkylthio, 2-($C_1$-$C_2$-alkoxycarbonyl)ethylthio or $C_1$-$C_6$-alkoxycarbonyl, wherein the alkyl group may be interrupted by one or two oxygen atoms in ether function, $L^8$ is a radical of the formula

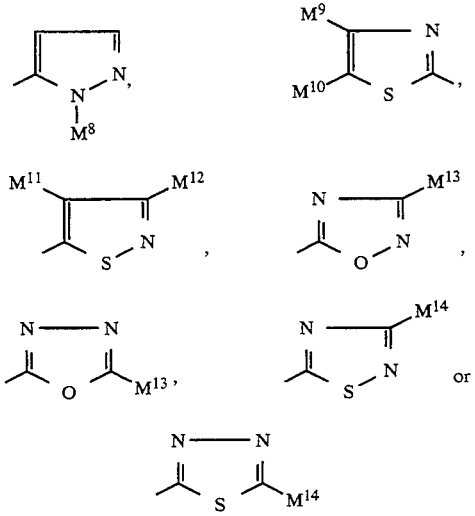

where $M^8$ is $C_1$-$C_6$-alkyl or cyclohexyl, $M^9$ is hydrogen, chlorine, $C_1$-$C_6$-alkyl optionally interrupted by 1 oxygen atom in ether function, $C_1$-$C_6$-alkoxy or $C_1$-$C_6$-alkoxycarbonyl, wherein the alkyl group may be interrupted by 1 or 2 oxygen atoms in ether function, $M^{10}$ is hydrogen, $C_1$-$C_6$-alkyl, cyano, nitro or $C_1$-$C_6$-alkoxycarbonyl, wherein the alkyl group may be interrupted by 1 or 2 oxygen atoms in ether function, $M^{11}$ is hydrogen, chlorine, cyano, nitro or $C_1$-$C_6$-alkoxycarbonyl, wherein the alkyl group may be interrupted by 1 or 2 oxygen atoms in ether function, $M^{12}$ is chlorine, $C_1$-$C_6$-alkyl optionally interrupted by 1 oxygen atom in ether function, $C_1$-$C_6$-alkoxy or $C_1$-$C_6$-alkylthio, $M^{13}$ is $C_1$-$C_6$-alkyl, and $M^{14}$ is hydrogen, chlorine, cyano, thiocyanato, $C_1$-$C_6$-alkyl optionally interrupted by 1 oxygen atom in ether function, $C_1$-$C_6$-alkoxy, $C_1$-$C_6$-alkylthio, 2-($C_1$-$C_2$-alkoxycarbonyl) ethylthio or $C_1$-$C_6$-alkoxycarbonyl, wherein the alkyl group may be interrupted by 1 or 2 oxygen atoms in ether function, $L^9$ is hydrogen, fluorine, chlorine, methyl or a radical of the formula —NH—CO—$B^1$, —NH—CO—$OB^1$, —NH—CO—$NB^1B^2$, NH—CS—$OB^1$, —NH—CS—$B^1B^2$, —NH—$SO_2$—$B^1$ or —NH—$SO_2$—$NB^1B^2$, where $B^1$ and $B^2$ are independently of the other $C_1$–$C_4$-alkyl, $L^{10}$ is hydrogen, fluorine or chlorine or $L^9$ and $L^{10}$ together are a fused benzo ring, $L^{11}$ is a radical of the formula
—CO—$OB^1$, —CO—$NHB^1$, —CO—NH—CO—$B^1$, —NH—CO—$B^1$, —NH—CO—$OB^1$, —NH—CO—$NB^1B^2$, —NH—CS—$OB^1$, —NH—CS—$B^1B^2$, —NH—$SO_2$—$B^1$ or —NH—$SO_2$—$NB^1B^2$, where $B^1$ and $B^2$ are each as defined above, $L^{12}$ is hydrogen or $C_1$–$C_4$-alkyl, $L^{13}$ and $L^{14}$ are each independently of the other hydrogen, $C_1$–$C_{12}$-alkyl, $C_5$–$C_7$-cycloalkyl, phenyl, pyridyl, $C_1$–$C_6$-alkanoyl $C_1$–$C_6$-alkoxycarbonyl, $C_1$–$C_6$-alkylsulfonyl, $C_5$–$C_7$-cycloalkylsulfonyl, phenylsulfonyl, pyridylsulfonyl, benzoyl, pyridylcarbonyl or thienylcarbonyl, or $R^2$ and $R^3$ are combined with the nitrogen atom joining them together into a five- or six-membered saturated heterocyclic radical which optionally contains further hetero atoms, $L^{15}$ is hydrogen or $C_1$–$C_6$-alkyl, $L^{16}$ is hydrogen, fluorine, chlorine or bromine, $L^{17}$ is fluorine, chlorine or bromine, $L^{18}$ is $C_1$–$C_{12}$-alkyl which may be interrupted by from one to three atoms in ether function, phenyl or hydroxyl, $L^{19}$ is cyano, carbamoyl, carboxy or $C_1$–$C_6$-alkoxycarbonyl, $L_{20}$ is $C_1$–$C_6$-alkyl or $C_3$–$C_4$-alkenyl and W is oxygen or a radical of the formula

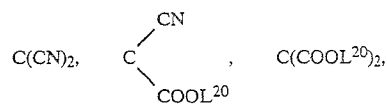

where $L_{20}$ in each case has the abovementioned meanings

Z is nitrogen or CH, $R^1$ and $R^2$ are each, independently of the other, hydrogen, $C_1$–$C_6$-alkyl or $C_1$–$C_6$-alkoxy optionally substituted by phenyl or $C_1$–$C_4$-alkoxy, $R^3$ is hydrogen, $C_1$–$C_6$-alkyl, $C_5$–$C_7$-cycloalkyl or $C_3$–$C_4$-alkenyl, $R^4$ is hydrogen, deuterium, methyl, trideuterated methyl or chlorine,.

$R^5$ is hydrogen or deuterium, $Y^1$ and $Y^2$ are each, independently of the other, $C_2$–$C_{11}$-alkylene optionally interrupted by from 1 to 3 oxygen atoms in ether function or imino or $C_1$–$C_4$-alkylimino groups, E is oxygen, imino or $C_1$–$C_4$-alkylimino, and X is hydroxyl, $C_1$–$C_6$-alkoxy, trideuterated methoxy, 2,3-epoxypropoxy, phenoxy, amino or $C_1$–$C_4$-mono- or -dialkylamino, and the ring A can be benzofused, such that the proportion of monomer units of the formula I is from 1 to 100 mol %, the proportion of monomer units of the formula II is from 0 to 99 mol %, the proportion of monomer units of the formula III is from 0 to 99 mol % and the proportion of monomer units of the formula IV is from 0 to 75 mol %, each percentage being based on the polymer formed, and the polymer having an average molecular weight of from 1,000 to 100,000.

* * * * *